Patented June 30, 1942

2,288,459

UNITED STATES PATENT OFFICE 2,288,459

HIGH-VOLTAGE POWER TRANSMISSION SYSTEM

Julius Jonas, Zurich, Switzerland, assignor to Aktiengesellschaft Brown, Boveri & Cie., Baden, Switzerland Application May 6, 1941, Serial No. 392,189
In Switzerland May 6, 1940

11 Claims. (Cl. 171—97)

This invention relates to high voltage polyphase electric transmission systems and particularly to means for protecting such systems from the effects of earth faults and short circuits.

For the transmission of polyphase alternating currents it is usual to employ a high-voltage line having the same number of conductors as phases. In order to protect the line against earth faults it is connected on the supply side of the network in star through the transformer arrangement and the star point is earthed by means of an earth fault extinction coil. To ensure that the earth fault arc is properly extinguished the inductance of the extinction coil with the earth capacity of the conductors is adjusted to be as near as possible in resonance with the operating frequency of the line. An exact resonance tuning is, however, impossible on account of the unequal earth capacities of the individual conductors, because with an exact adjustment and unequal earth capacities even on a line where there is no fault there will be a considerable voltage displacement of the star point to earth. For this reason it is necessary with the usual alternating current conductors, which due to unequal heights above the ground can have very different capacities, to detune the extinction coil so as to be out of resonance in order to avoid detrimental neutral point displacements. With three-phase conductors which have to transmit high powers over a great distance and have thus to be operated at high voltages, the employment of correctly adjusted extinction coils is, however, frequently impossible because the voltage displacement of the unaffected conductors occurring with an earth fault and amounting to $\sqrt{3}$ times the phase voltage to earth is excessive in view of the insulation which the line would require.

The present invention is therefore concerned with a high-voltage power transmission system for polyphase currents, whereby it is possible to adjust the extinction coils so as to obtain a much more accurate resonance tuning and thus improve the extinguishing effect, whilst at the same time enabling high powers to be transmitted with low losses and without excessive insulation of the line. In addition the safety of operation of the system is improved. This is achieved according to the invention by providing the high-voltage line with a positive and negative conductor for each phase, and insulating the individual phases of the polyphase current electrically from each other and earthing their midpoints by means of separate earth fault extinction coils which are not magnetically coupled.

The invention also comprises the provision of separate magnetically uncoupled transformers supplying the paired conductors of each phase, and the protection of such high voltage lines from the effects of double pole earth faults and direct short-circuits in a single phase by providing in the low voltage circuit of each transformer an automatic high-speed circuit breaker, actuated, for example, by a minimum-voltage or an overcurrent relay.

Constructional examples of the invention are illustrated diagrammatically in the accompanying drawings where Fig. 1 shows the connections for the line conductors, transformers and the separate extinction coils of a high-voltage power transmission system.

Figure 1:
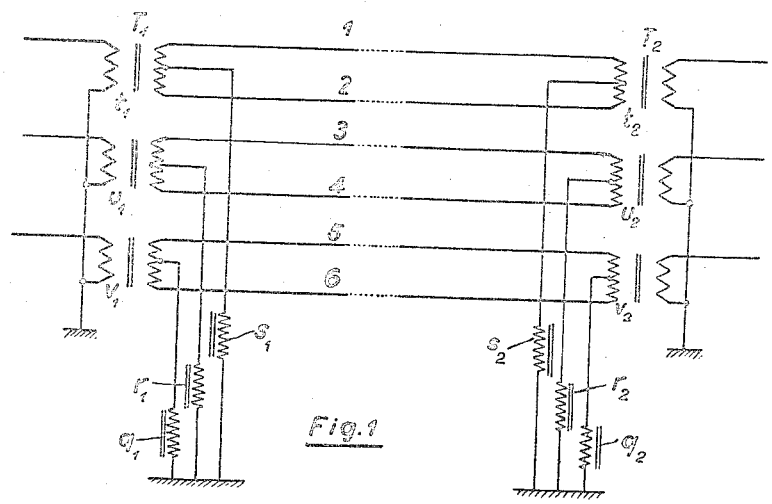

In Fig. 1 an overhead transmission line with six separate conductors 1 to 6 is shown, this line being connected at both ends to the high-voltage sides of the transformer groups $T_1$ and $T_2$. These transformer groups each comprise a number of single-phase transformers $t_1$, $u_1$, $v_1$ and $t_2 u_2 v_2$ respectively, corresponding to the number of line phases. On the high-voltage side of each transformer each phase has its own positive and negative conductors so that the phases are electrically insulated from each other. The midpoints of the high-voltage windings of all phases are earthed by means of the extinction coils $q_1 r_1 s_1$ and $q_2 r_2 s_2$ respectively. The individual earth fault extinction coils are not magnetically coupled together. The low-voltage sides of the transformer arrangements can as usual be star-connected. If now for instance an earth fault occurs between the conductor 6 and the ground, an earth current will only flow in the extinction coil $q_1$ and cause a voltage displacement of the conductor 5. When there is no permanent fault the coil $q_1$ extinguishes the earth fault arc in a manner well known to the art and normal conditions are again restored. It is possible that all three phases can have an earth fault on one conductor, but the extinction of the arc is not affected by this. Conditions are exactly the same when there is a permanent earth fault. The line can be operated without difficulty when there is a permanent earth fault on all three phases. On the other hand, however, if one phase has a double-pole earth fault or a short-circuit, the conductors in question can be simply disconnected and the power is transmitted without interruption by means of the remaining four conductors as a two-phase system. In an emergency it is even possible to transmit a reduced power single phase, when both other phases have short-circuits. Under such operating conditions the remaining phase may also have a single-pole earth fault which will be removed by the earth fault extinction coil associated with this phase. The safety of operation of such power transmission systems is thus assured for a variety of conditions. The system shown in Fig. 1 where the transformer arrangement consists of a number of independent single-phase transformers also possesses the advantage that for high powers and voltages the single-phase transformers do not exceed the allowable loading gauge on the railway, whilst a single three-phase transformer for the same power would be too large for transportation by rail.

A power transmission line of the kind shown in Fig. 1 possesses the special advantage that each single-phase transformer can be built together with its associated extinction coil and located in the same oil tank. This construction is illustrated diagrammatically in Fig. 3 where 7 indicates the iron core, 8 the primary winding and 9 the secondary winding of the transformer. The earth fault extinction coil is preferably located in the lower part of the oil tank 10 and possesses its own iron core 11 on which a winding 12 is wound. Naturally the inductance of the extinction coil can be made variable. This construction results in very practical units being formed which can be quickly assembled and enable space and money to be saved because the connection 13 between the coil 12 and the high-voltage winding 9 does not require any bushing insulators.

Figure 2:
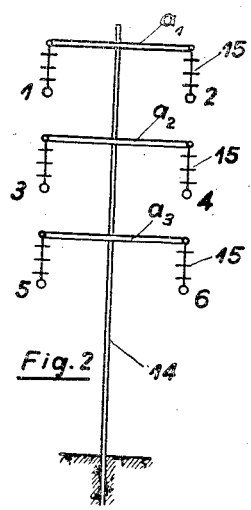
Fig. 2 shows the most preferable arrangement of the line conductors on the masts.

In addition to the aforementioned advantages it is also possible to improve the arc extinguishing effect of the earth fault extinction coils. With the usual extinction coil connected to the star point of a three-wire system the magnitude of the residual current which still flows at the earth fault point depends upon the degree of variation from the resonance tuning, this variation out of consideration for the voltage displacement at normal operation increasing as the inequalities in the partial capacities of the line to earth increases. If, however, each phase has its own positive and negative conductor as in Fig. 1, then the conductors are preferably arranged on the transmission mast as indicated in Fig. 2. The mast 14 is provided with three cross-arms $a_1 a_2 a_3$ each of which carries both conductors of one phase. The insulator strings 15 for all wires are of the same size. The partial capacities of the conductors of one phase are therefore practically equal and it is thus possible to tune the earth fault extinction coils very near to resonance without appreciable voltage displacements occurring. By this means the extinguishing effect of the coils is considerably improved and the residual current maintained at a very low value. Instead of arranging the line conductors all on one mast it is also possible to locate each phase on a separate mast, whereupon care must be taken that the partial capacities of the conductors of each phase agree with each other as far as possible. The partial capacities to earth of each single-phase line do not, however, need to be of the same magnitude.

Since in the power transmission line described each of the single-phase systems is protected by a special extinction coil, single-pole earth faults on these single-phase systems do not disturb the operation of the line. Power can be transmitted in each of these systems without interruption even when an earth fault occurs. Conditions are, however, different when double-pole earth faults occur in a polyphase transmission line. In this event the network is short-circuited by the double-pole earth fault and upon the occurrence of such a disturbance there is no other alternative but to disconnect the conductor which is short-circuited. This method is well known but has the disadvantage that the power transmission is completely interrupted for a time. Dividing up the polyphase network into three independent single-phase networks has the advantage that when one network is disconnected the others can continue to transmit power, although with an unsymmetrical three-phase connection. This is, however, accompanied by another disadvantage because it is then necessary at the same time as the disturbed high-voltage network is disconnected to short-circuti the phase winding associated with this network on the primary side of the high-voltage transformer, because otherwise with a primary winding which is star-connected this phase winding would choke the primary current. Due to the short-circuiting of the aforementioned phase winding the phase angle between the other primary phase windings changes from 120° to 60° so that the primary system continues to operate with an open delta connection (V-connection). The voltage in these two windings thus increases to $\sqrt{3}$ times the normal voltage and the current in each winding also attains $\sqrt{3}$ times its normal value. Generally this is, however, inadmissible in practice so that there is not much advantage to be obtained by merely disconnecting the disturbed single-phase network instead of the entire line. A further disadvantage of this arrangement is that it is necessary to disconnect the high-voltage network.

A further object of the present invention is therefore to enable a polyphase high-voltage line which is divided into three single-phase networks to continue in operation even when a double-pole earth fault or short-circuit occurs, without having to provide circuit breakers in the line for this purpose and without the occurrence of high magnetic currents and eddy current losses due to an excessive iron saturation in the transformer as a result of an increase in voltage. A higher current loading of the winding cannot be avoided but to counteract this the power which is being transmitted can always be temporarily reduced.

This further improvement according to the invention is based on a realisation of the following facts. Whilst the single-pole earth fault in the (secondary) high-voltage network is a static phenomena which does not affect the primary network which is electrically insulated from the secondary network, the double-pole earth fault and the direct short-circuit are of a dynamic nature and affect all elements of the installation including the primary network and the generator. Whilst the extinction coil must be connected to the high-voltage secondary network itself, on account of the aforementioned conditions the protective device against double-pole earth faults can be located in the low-voltage primary network. But this means protective switching devices in the high-voltage network are avoided. The magnetic overloading of the transformer iron can also be avoided by connecting the primary windings of the three single-phase transformers in delta and arranging an automatically operating switching device in each side of the winding triangle, these switching devices being operated by a low-voltage relay connected to the voltage of the associated side of the triangle or by means of an excess-current relay actuated by the short-circuit current, so as to open the circuit of the side of the triangle in question when a disturbance occurs. As a result of this arrangement of the connections the voltages on the primary windings of the phases unaffected by the fault remain unchanged. The system which remains after the disturbed single-phase network has been disconnected continues to operate with open delta connection (V-connection) without any increase in voltage or field of the transformer. The transformers at the end of the line are also connected in exactly the same manner and provided with protective devices. With these transformers the low-voltage windings are also connected in delta and switches are arranged in the sides of the delta connection which upon the occurrence of a disturbance are opened by means of quick-acting devices.

Therefore according to the invention in a high-voltage power transmission system for polyphase current in which the transformer arrangement connected to the high-voltage line consists of a number of single-phase transformers equal to the number of current phases and not magnetically connected together, automatic quick-acting switching devices are provided which upon the occurrence of a double-pole earth fault or a direct short-circuit on one of the high-voltage single-phase networks cut off the voltage from the winding associated with this network and located on the low-voltage side of the transformer. When three-phase current has to be transmitted a very favourable arrangement can be obtained if both at the beginning and end of the line the windings lying on the low-voltage side of the three single-phase transformers are connected in delta and upon the occurrence of a disturbance the quick-acting switching device opens that side of the winding triangle associated with the high-voltage single-phase network which is affected. The quick-acting switching devices can be so arranged that upon the occurrence of a disturbance soon after the first disconnection the circuit of the phase which has been opened is closed again, but opened again if the fault is not cleared so that finally the circuit breaker is left open or closed depending upon whether the short-circuit continues or has disappeared. If the short-circuit continues it is expedient to reduce the power to two-thirds of its normal value because otherwise the undisturbed phases operating in V-connection will be heavily overloaded whilst with the aforesaid reduction in power the windings will only have to carry a current overload of about 15% which can be taken by the system for a long time without any risks.

Figure 4:
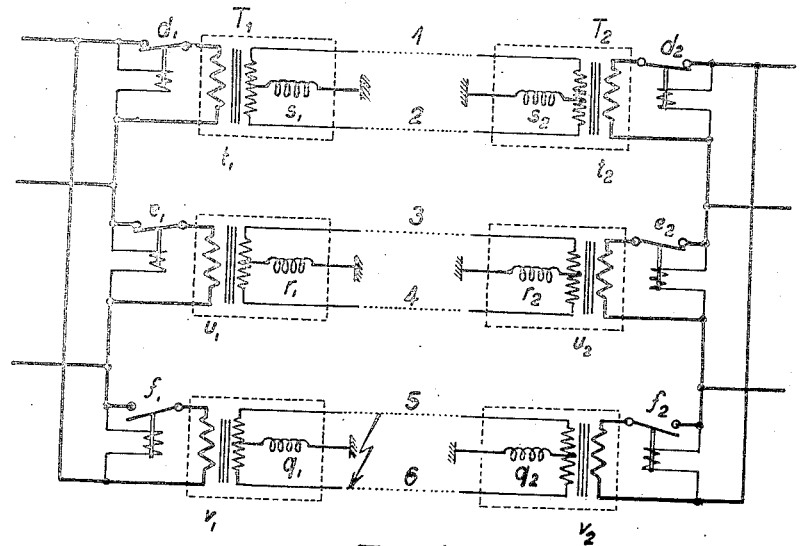
Fig. 4 shows a modified form of the invention and Fig. 5 the vector diagram for the arrangement of Fig. 4.
Figure 5:
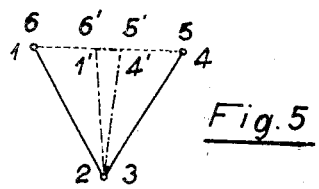

A constructional example of this arrangement is illustrated in Fig. 4 of the accompanying drawings whilst Fig. 5 shows the vector diagram for the arrangement. As in Fig. 1 the six high-voltage conductors are designated by the reference numerals 1-6. Each transformer group $T_1$ and $T_2$ consists of three single-phase transformers $t_1u_1v_1$ and $t_2u_2v_2$ respectively the low-voltage windings of which are connected in delta, the mid-points of the high-voltage windings each being earthed by means of an earth fault extinction coil $q_1r_1s_1$ and $q_2r_2s_2$ respectively. Switches $d_1e_1f_1$ and $d_2e_2f_2$ respectively are arranged in each winding branch of the low-voltage phases, these switches being equipped with a minimum voltage release device which, when as a result of a short-circuit on one of the high-voltage phases the voltage of this phase collapses, automatically causes the circuit with which it is associated to open as indicated in Fig. 4 for the phase 5—6. Since both transformers $v_1v_2$ are short-circuited on the high-voltage side, switches $f_1$ and $f_2$ at both ends of the line 5—6 are also opened. It is expedient to construct the switches for high-speed operation.

In the vector diagram of Fig. 5 it is assumed that as a result of the short-circuit between the high-voltage conductors 5 and 6 the voltage drops suddenly to the value 5' 6' whereby the other phase voltages assume temporarily the directions 1' 2 and 3 4'. Since, however, the no-volt relay of the phase 5—6 operates momentarily and opens the switch $f_1$, both the voltage vectors of the unaffected phases return to the positions 1, 2 and 3, 4 and form a V-connection whereby the line can continue to transmit a normal alternating current without using the faulty conductor.

Earth fault protection by means of the extinction coils $q_1r_1s_1$ and $q_2r_2s_2$ is in no way affected by the operation of the short-circuit protection. It remains effective in the phases where there is no short-circuit even when the conductors of neighbouring networks touch each other.

Figure 3:
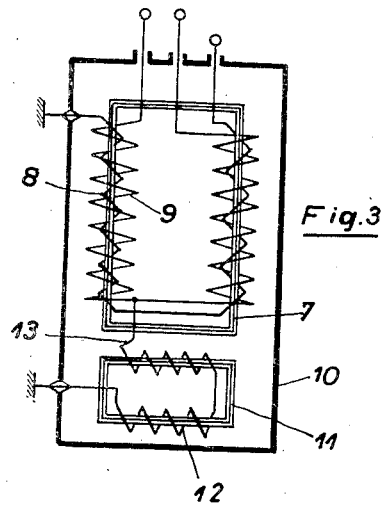
Fig. 3 illustrates one of the units, comprising a single-phase transformer and extinction coil, used for the system shown in Fig. 1.

In order to save high-voltage insulation the earth fault extinction coils are located in the same oil-filled housings as the associated transformers, this being indicated in the drawings by the dotted boundary lines in Fig. 4 and shown in detail in Fig. 3.

The minimum voltage release devices for the switches can also be replaced by maximum current release devices. The low-voltage side of the transformer groups $T_1T_2$ can be connected in star instead of delta, in which case a neutral wire is necessary for connecting the neutral point of the primary transformer winding with that of the generator or load.

By means of the arrangement according to the invention earth fault protection can thus be extended to cover cases of double-pole earth faults. The operation of the described system is as follows:

(1) The extinction coil connected to the high-voltage winding of the transformer affords protection against the effects of a single-phase earth fault in the high-voltage circuit.

(2) Switching devices which disconnect parts of the low-voltage winding of the transformer either temporarily or permanently afford protection against the effects of a double-pole earth fault in the high-voltage circuit.

Both protective arrangements enable the network to remain in service even upon the occurrence of a disturbance and in (case 1) full service and in (case 2) about two-thirds normal service can be maintained.

I claim:
1. In a high voltage polyphase electric transmission system, a pair of conductors for each phase, each of said pairs comprising a positive and a negative conductor for the phase corresponding thereto and being electrically insulated from each other, and separate fault extinction coils having substantially no magnetic intercoupling connecting the midpoints of each pair of phase conductors with ground.

2. In a high voltage polyphase electric transmission system, a pair of conductors for each phase, each of said pairs comprising a positive and a negative conductor for the phase corresponding thereto and being electrically insulated from each other, separate magnetically uncoupled single phase transformers supplying current to each of said pairs, and separate fault extinction coils having substantially no magnetic intercoupling connecting the midpoint of the high voltage winding of each of said transformers to ground.

3. In a high voltage polyphase electric transmission system, a pair of conductors for each phase, each of said pairs comprising a positive and a negative conductor for the phase corresponding thereto and being electrically insulated from each other, separate magnetically uncoupled single-phase transformers supplying current to each of said pairs, and separate fault extinction coils having substantially no magnetic intercoupling connecting the midpoint of the high voltage winding of each of said transformers to ground, each of said transformers and the extinction coil associated therewith being positioned in a single oil chamber including the connection between the coil and the midpoint of the high voltage transformer winding.

4. In a high voltage polyphase electric transmission system, a pair of conductors for each phase, each of said pairs comprising a positive and a negative conductor for the phase corresponding thereto and being electrically insulated from each other, separate magnetically uncoupled single phase transformers supplying current to each of said pairs, and separated fault extinction coils having substantially no magnetic intercoupling connecting the midpoint of the high voltage winding of each of said transformers to ground, each of said transformers and the extinction coil associated therewith being positioned in a single oil chamber including the connection between the coil and the midpoint of the high voltage transformer winding, said transformers and said extinction coils having separate magnetic circuit members.

5. In a high voltage polyphase electric transmission system, a pair of conductors for each phase, each of said pairs comprising a positive and a negative conductor for the phase corresponding thereto and being electrically insulated from each other, the conductors of each pair being spatially arranged so that the capacity to ground of each conductor of a pair is substantially equal, and separate fault extinction coils having substantially no magnetic intercoupling connecting the midpoints of each pair of phase conductors with ground.

6. In a high voltage polyphase electric transmission system, a pair of conductors for each phase, each of said pairs comprising a positive and a negative conductor for the phase corresponding thereto and being electrically insulated from each other, the conductors of said pairs being spatially arranged with all positive conductors on one side of a supporting structure and all negative conductors on the opposite side of the supporting structure and the conductors of each pair being on the same level, and separate fault extinction coils having substantially no magnetic intercoupling connecting the midpoints of each pair of phase conductors with ground.

7. In a high voltage polyphase electric transmission system, a pair of conductors for each phase, each of said pairs comprising a positive and a negative conductor for the phase corresponding thereto and being electrically insulated from each other, separate magnetically uncoupled single phase transformers supplying current to each of said pairs, separate fault extinction coils having substantially no magnetic intercoupling connecting the midpoint of of high voltage winding of each of said transformers to ground, and an automatic high-speed circuit breaker in the low voltage circuit of each of said transformers adapted to disconnect the low voltage winding on the occurrence of a double-pole earth fault or a direct short-circuit in the single phase transmission circuit associated therewith.

8. In a high voltage three-phase electric transmission system, a pair of conductors for each phase, each of said pairs comprising a positive and a negative conductor for the phase corresponding thereto and being electrically insulated from each other, separate magnetically uncoupled single phase transformers supplying current to each of said pairs, the low voltage windings of the transformers at each end of the transmission line being connected together in delta, separate fault extinction coils having substantially no magnetic intercoupling connecting the midpoint of the high voltage winding of each of said transformers to ground, and an automatic high-speed circuit breaker in the low voltage circuit of each of said transformers adapted to disconnect the low voltage winding on the occurrence of a double-pole earth fault or a direct short-circuit in the single phase transmission circuit associated therewith.

9. In a high voltage polyphase electric transmission system, a pair of conductors for each phase, each of said pairs comprising a positive and a negative conductor for the phase corresponding thereto and being electrically insulated from each other, separate magnetically uncoupled single phase transformers supplying current to each of said pairs, separate fault extinction coils having substantially no magnetic intercoupling connecting the midpoint of the high voltage winding of each of said transformers to ground, an automatic high speed circuit breaker in the low circuit of each of said transformers, and a minimum-voltage relay in each of said low voltage circuits adapted to actuate the corresponding circuit breaker on the occurrence of a double-pole earth fault or a direct short-circuit in the single phase transmission circuit associated therewith.

10. In a high voltage polyphase electric transmission system, a pair of conductors for each phase, each of said pairs comprising a positive and a negative conductor for the phase corresponding thereto and being electrically insulated from each other, separate magnetically uncoupled single phase transformers supplying current to each of said pairs, separate fault extinction coils having substantially no magnetic intercoupling connecting the midpoint of the high voltage winding of each of said transformers to ground, an automatic high speed circuit breaker in the low voltage circuit of each of said transformers, and an overcurrent relay in each of said low voltage circuits adapted to actuate the corresponding circuit breaker on the occurrence of a double-pole earth fault or a direct short-circuit in the single phase transmission circuit associated therewith.

11. In a high voltage polyphase electric transmission system, a pair of conductors for each phase, each of said pairs comprising a positive and a negative conductor for the phase corresponding thereto and being electrically insulated from each other, separate magnetically uncoupled single phase transformers supplying current to each of said pairs, separate fault extinction coils having substantially no magnetic intercoupling connecting the midpoint of the high voltage winding of each of said transformers to ground, and an automatic high-speed circuit breaker in the low voltage circuit of each of said transformers adapted to disconnect the low voltage winding on the occurrence of a double-pole earth fault or a direct short-circuit in the single phase transmission circuit associated therewith, to reconnect the winding after a predetermined interval and to again disconnect the winding if the disturbance continues.

JULIUS JONAS.